(12) United States Patent
Oberheu et al.

(10) Patent No.: US 9,639,945 B2
(45) Date of Patent: May 2, 2017

(54) DEPTH-BASED APPLICATION OF IMAGE EFFECTS

(71) Applicant: Lytro, Inc., Mountain View, CA (US)

(72) Inventors: Kent Oberheu, Berkeley, CA (US); Colvin Pitts, Snohomish, WA (US); Duane Petrovich, San Francisco, CA (US); Ariel Braunstein, San Francisco, CA (US)

(73) Assignee: Lytro, Inc., Mountain View, CA (US)

( * ) Notice: Subject to any disclaimer, the term of this patent is extended or adjusted under 35 U.S.C. 154(b) by 137 days.

(21) Appl. No.: 14/837,465

(22) Filed: Aug. 27, 2015

(65) Prior Publication Data

US 2017/0061635 A1 Mar. 2, 2017

(51) Int. Cl.
*G06K 9/00* (2006.01)
*G06T 7/00* (2017.01)

(52) U.S. Cl.
CPC .. *G06T 7/0061* (2013.01); *G06T 2207/10012* (2013.01); *G06T 2207/10028* (2013.01); *G06T 2215/16* (2013.01)

(58) Field of Classification Search
CPC . G06T 2207/10012; G06T 2207/10028; G06T 2215/16
See application file for complete search history.

(56) References Cited

U.S. PATENT DOCUMENTS

| | | | |
|---|---|---|---|
| 4,661,986 A | 4/1987 | Adelson | |
| 5,076,687 A | 12/1991 | Adelson | |
| 5,748,371 A | 5/1998 | Cathey, Jr. et al. | |
| 6,201,899 B1 | 3/2001 | Bergen | |
| 6,320,979 B1 | 11/2001 | Melen | |
| 6,785,667 B2 | 8/2004 | Orbanes et al. | |
| 7,623,726 B1 * | 11/2009 | Georgiev | H04N 13/0022 382/255 |

(Continued)

FOREIGN PATENT DOCUMENTS

WO    2011029209    3/2011

OTHER PUBLICATIONS

Agarwala, A., et al., "Interactive Digital Photomontage," ACM Transactions on Graphics, Proceedings of SIGGRAPH 2004, vol. 32, No. 3, 2004.

(Continued)

*Primary Examiner* — Samir Ahmed
(74) *Attorney, Agent, or Firm* — Raubvogel Law Office

(57) ABSTRACT

An image such as a light-field image may be captured with a light-field image capture device with a microlens array. The image may be received in a data store along with a depth map that indicates depths at which objects in different portions of the image are disposed. A function may be applied to the depth map to generate a mask that defines a gradual transition between the different depths. An effect may be applied to the image through the use of the mask such that applicability of the effect is determined by the mask. A processed image may be generated. The first effect may be present in the processed image, as applied previously. The processed image may be displayed on a display device. If desired, multiple effects may be applied through the generation of multiple masks, depth maps, and/or intermediate images prior to generation of the processed image.

37 Claims, 17 Drawing Sheets

(56) References Cited

U.S. PATENT DOCUMENTS

| | | |
|---|---|---|
| 7,945,653 B2 | 5/2011 | Zuckerberg et al. |
| 8,155,478 B2 | 4/2012 | Vitsnudel et al. |
| 8,559,705 B2 | 10/2013 | Ng |
| 8,749,620 B1 | 6/2014 | Pitts et al. |
| 8,811,769 B1 | 8/2014 | Pitts et al. |
| 8,831,377 B2 | 9/2014 | Pitts et al. |
| 8,908,058 B2 | 12/2014 | Akeley et al. |
| 8,948,545 B2 | 2/2015 | Akeley et al. |
| 8,995,785 B2 | 3/2015 | Knight et al. |
| 2002/0015048 A1 | 2/2002 | Nister |
| 2003/0103670 A1 | 6/2003 | Schoelkopf et al. |
| 2004/0114176 A1 | 6/2004 | Bodin et al. |
| 2006/0130017 A1 | 6/2006 | Cohen et al. |
| 2007/0071316 A1 | 3/2007 | Kubo |
| 2007/0188613 A1 | 8/2007 | Nobori et al. |
| 2007/0269108 A1 | 11/2007 | Steinberg et al. |
| 2011/0018903 A1 | 1/2011 | Lapstun et al. |
| 2011/0050864 A1* | 3/2011 | Bond .............. H04N 13/026 348/51 |
| 2013/0215226 A1 | 8/2013 | Chauvier et al. |
| 2014/0092424 A1* | 4/2014 | Grosz .............. G06F 3/0484 358/1.15 |
| 2014/0193047 A1* | 7/2014 | Grosz .............. G06F 3/1242 382/118 |
| 2014/0195921 A1* | 7/2014 | Grosz .............. G06F 3/1242 715/738 |
| 2015/0104101 A1 | 4/2015 | Bryant et al. |

OTHER PUBLICATIONS

Nguyen, Hubert. "Practical Post-Process Depth of Field." GPU Gems 3. Upper Saddle River, NJ: Addison-Wesley, 2008.
Shade, Jonathan, et al., "Layered Depth Images", SIGGRAPH 98, pp. 1-2.

* cited by examiner

DEPTH-BASED APPLICATION OF IMAGE EFFECTS

CROSS-REFERENCE TO RELATED APPLICATIONS

The present application is related to U.S. application Ser. No. 13/774,925 for "Compensating for Sensor Saturation and Microlens Modulation During Light-Field Image Processing", filed Feb. 22, 2013, issued on Feb. 3, 2015 as U.S. Pat. No. 8,948,545, the disclosure of which is incorporated herein by reference in its entirety.

The present application is related to U.S. Utility application Ser. No. 13/774,971 for "Compensating for Variation in Microlens Position During Light-Field Image Processing", filed on Feb. 22, 2013, issued on Sep. 9, 2014 as U.S. Pat. No. 8,831,377, the disclosure of which is incorporated herein by reference in its entirety.

The present application is related to U.S. Utility application Ser. No. 13/774,986 for "Light-Field Processing and Analysis, Camera Control, and User Interfaces and Interaction on Light-Field Capture Devices", filed on Feb. 22, 2013, issued on Mar. 31, 2015 as U.S. Pat. No. 8,995,785, the disclosure of which is incorporated herein by reference in its entirety.

The present application is related to U.S. Utility application Ser. No. 13/688,026 for "Extended Depth of Field and Variable Center of Perspective in Light-Field Processing", filed on Nov. 28, 2012, issued on Aug. 19, 2014 as U.S. Pat. No. 8,811,769, the disclosure of which is incorporated herein by reference in its entirety.

The present application is related to U.S. Utility application Ser. No. 11/948,901 for "Interactive Refocusing of Electronic Images,", filed Nov. 30, 2007, issued on Oct. 15, 2013 as U.S. Pat. No. 8,559,705, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same,", filed Feb. 10, 2010, now abandoned, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011, issued on Jun. 10, 2014 as U.S. Pat. No. 8,749,620, the disclosure of which is incorporated herein by reference in its entirety.

The present application is related to U.S. Utility application Ser. No. 13/155,882 for "Storage and Transmission of Pictures Including Multiple Frames,", filed Jun. 8, 2011, issued on Dec. 9, 2014 as U.S. Pat. No. 8,908,058, the disclosure of which is incorporated herein by reference in its entirety.

The present application is related to U.S. Utility application Ser. No. 13/533,319 for "Depth-Assigned Content for Depth-Enhanced Pictures,", filed Jun. 26, 2012, the disclosure of which is incorporated herein by reference in its entirety.

TECHNICAL FIELD

The present disclosure relates to systems and methods for processing and displaying image data, and more specifically, to systems and methods for implementing depth-based effects in images such as light-field images.

BACKGROUND

In conventional photography, the camera must typically be focused at the time the photograph is taken. The resulting image may have only color data for each pixel; accordingly, any object that was not in focus when the photograph was taken cannot be brought into sharper focus because the necessary data does not reside in the image. Further, editing such images to provide effects, such as changing colorization, changing contrast, or inserting and/or removing objects in the image, can be challenging. Typically, the user must employ careful selection of object boundaries to control how the effects are applied. Accordingly, application of effects in conventional images can be a time-consuming and labor-intensive effort.

By contrast, light-field images typically encode additional data for each pixel related to the trajectory of light rays incident to that pixel when the light-field image was taken. This data can be used to manipulate the light-field image through the use of a wide variety of rendering techniques that are not possible to perform with a conventional photograph. In some implementations, a light-field image may be refocused and/or altered to simulate a change in the center of perspective (CoP) of the camera that received the image. Further, a light-field image may be used to generate an enhanced depth-of-field (EDOF) image in which all parts of the image are in focus. A depth map can typically be obtained from a light-field image, indicating the depth at which objects in the light-field image were disposed, relative to the light-field camera, at the time the light-field image was captured.

It would be an advancement in the art to provide systems and methods for implementing effects in light-field images that can benefit from the unique properties of light-field images. Further, it would be an advancement in the art to provide systems and methods for implementing effects that are less time-consuming and labor-intensive than those applicable to conventional images.

SUMMARY

According to various embodiments, the system and method of the technology described herein process image data, such as light-field image data, so as to implement various effects based on depth characteristics of the image data. Such effects may include, but are not limited to, replacing one or more objects, modifying an exposure level, modifying a contrast level, modifying a saturation level, and/or modifying a color set of the image. These effects may be implemented in a four-dimensional domain and/or in a two-dimensional domain (as in a light-field image that has already been processed to focus it at one or more depths, such as an EDOF image). In this manner, the effects can be made to depend on (and to vary based on) the depth of objects in the scene.

A first image such as a light-field image may be captured with a light-field image capture device such as a light-field camera with a microlens array, a camera array, a stereoscopic or multiscopic camera, or the like. The first image may be received in a data store along with a first depth map that indicates first and second depths at which objects in first and second portions of the first image are disposed, respectively, relative to the camera at the time of image capture. A first function may be applied to the first depth map to generate a first mask that may define a gradual transition and/or one or more sharp transitions between the first and second depths, showing how application of an effect may be varied, sharply and/or gradually, between the first and second depths. Rather than providing simple binary information for each pixel, the first mask may provide for multiple gradations of intensity for any given pixel, indicating partial applicability of an effect to the pixel.

A first effect may be applied to the first image. This may be done through the use of the first mask such that applicability of the first effect is determined (for example, limited) by the first mask. The mask may be non-binary, as indicated previously, which may allow for variable degrees of applicability of the first effect to each pixel of the image.

A processed image may be generated. The first effect may be present in the processed image, as applied previously. The processed image may be displayed on a display device. If desired, multiple effects may be applied. Application of multiple effects may entail generation of multiple masks, generation of multiple depth maps, and/or generation of one or more intermediate images prior to generation of the processed image. Such masks, depth maps, and/or intermediate images may be provided by application of effects, and may be taken as input to application of subsequent effects.

Each function (such as the first function referenced above) may be a mathematical function. Such mathematical functions may include, but are not limited to, ramp functions, bell functions, and radial functions. Such functions may determine the manner in which the mask transitions between depths in the depth map, such as the first and second depths. A ramp function may provide a linear gradient, while the bell function may provide a bell-shaped transition particularly suited to applying the effect to a larger or lesser extent in the middle depths (i.e., depths that are displaced from the maximum and minimum depths of the depth map) of the image. A radial function may provide a radial transition that is affected not just by the depth of a pixel in the depth map, but also by the x and y coordinates of the pixel within the image.

If desired, the user may provide input directing how the function is applied. For example, the user may provide coordinates on which application of a radial function is to be focused, or a maximum and/or a minimum depth at which the mask is to be applied, thereby limiting application of the effect to the maximum and/or minimum depth.

Generation of the processed image may be carried out in various ways. In some examples, the first mask may be generated in two dimensions, and the effect may be applied by back-projecting the first mask into the four-dimensional domain of a light-field image. Additionally or alternatively, the image may be an EDOF image obtained by processing a light-field image. Additionally or alternatively, the image may be a projection at a specific depth, of a light-field image. Various combination methods may be used in conjunction with the foregoing to combine multiple effects in the processed image.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DEFINITIONS

For purposes of the description provided herein, the following definitions are used:
  Depth: a representation of distance between an object and/or corresponding image sample and a microlens array of a camera.
  Depth map: a two-dimensional map corresponding to a light-field image, indicating a depth for each of multiple pixel samples within the light-field image.
  Disk: a region in a light-field image that is illuminated by light passing through a single microlens; may be circular or any other suitable shape.
  Extended depth of field (EDOF) image: an image that has been processed to have objects in focus along a greater depth range.
  Gradual transition: a transition in application of an effect to an image that provides for partial application of the effect to at least a portion of the image.
  Function: a mathematical relationship that provides one or more outputs for each set of one or more inputs
  Image: a two-dimensional array of pixel values, or pixels, each specifying a color.

Light-field image: an image that contains a representation of light-field data captured at the sensor.

Mask: a description of the degree to which an effect is to be applied to an image; may be (but need not be) a pictorial grayscale overlay of the image.

Microlens: a small lens, typically one in an array of similar microlenses.

Processed light-field image: the resulting image after one or more processing steps are applied to a light-field image.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 2:
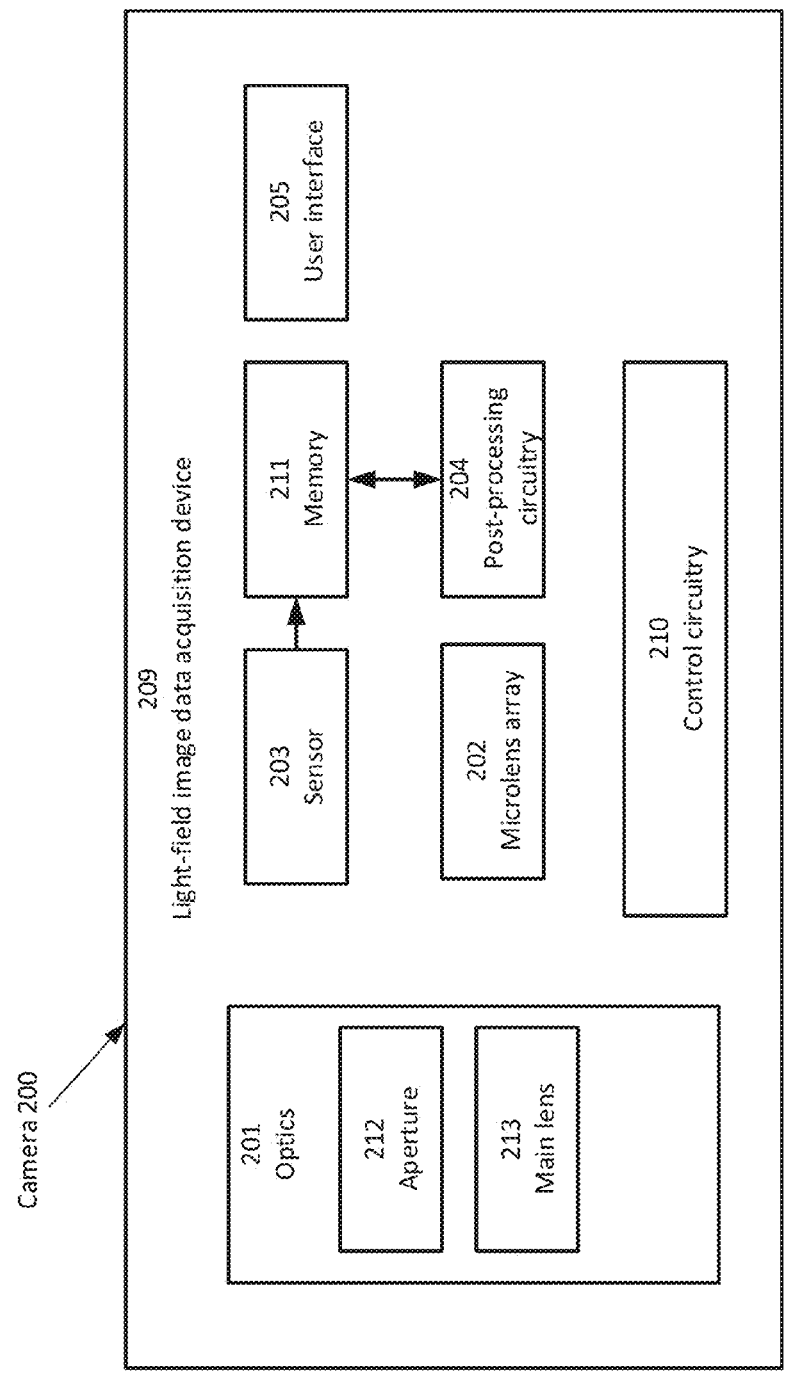
FIG. 2 depicts an example of an architecture for implementing the methods of the present disclosure in a light-field capture device, according to one embodiment.
Figure 3:
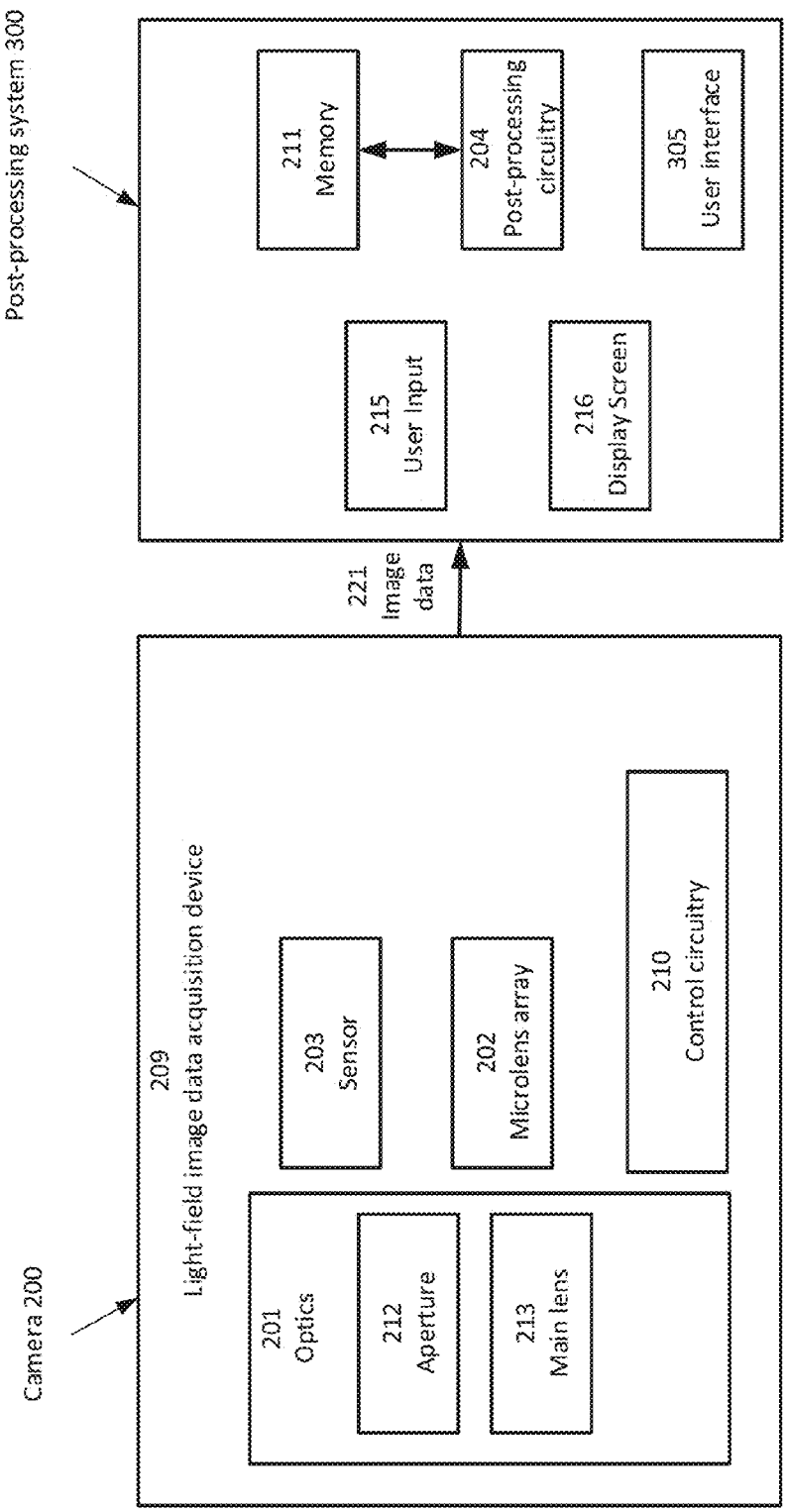
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting an architecture for implementing the method of the present disclosure in a light-field capture device such as a camera 200. Referring now also to FIG. 3, there is shown a block diagram depicting an architecture for implementing the method of the present disclosure in a post-processing system 300 communicatively coupled to a light-field capture device such as a camera 200, according to one embodiment. One skilled in the art will recognize that the particular configurations shown in FIGS. 2 and 3 are merely exemplary, and that other architectures are possible for camera 200. One skilled in the art will further recognize that several of the components shown in the configurations of FIGS. 2 and 3 are optional, and may be omitted or reconfigured.

Figure 4:
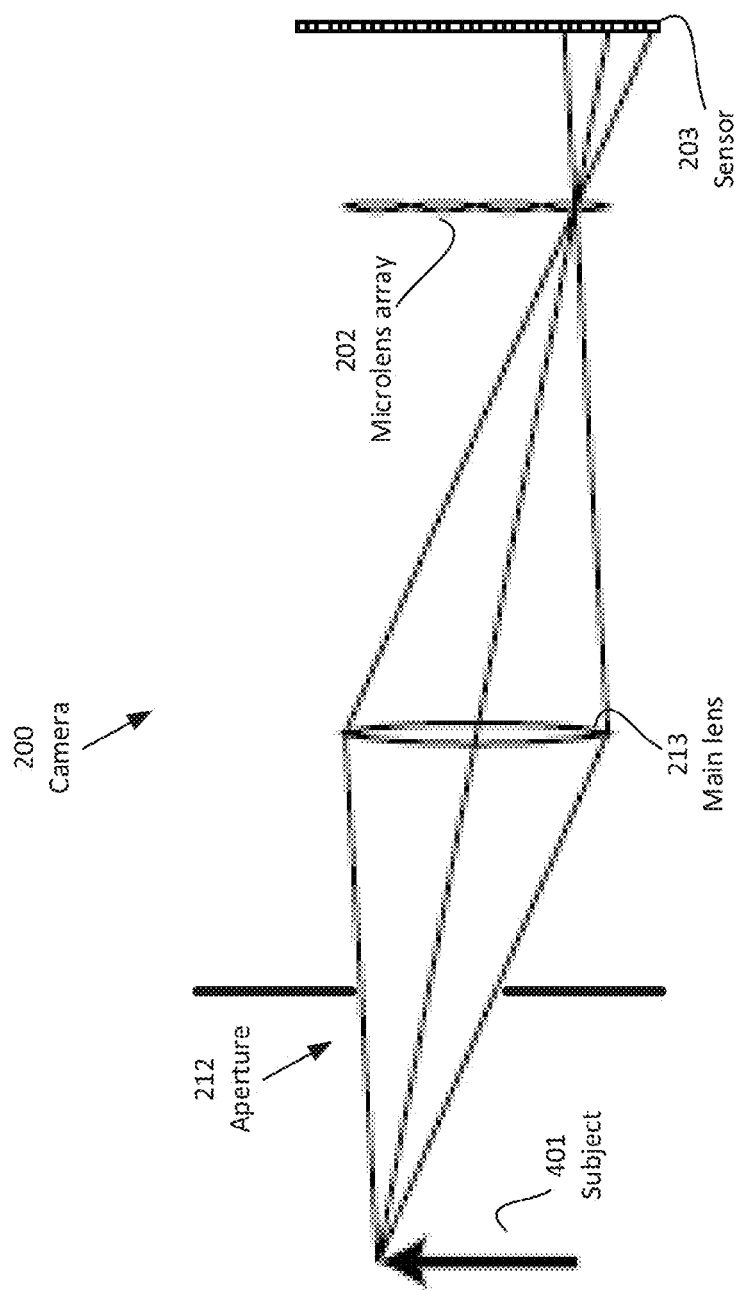
FIG. 4 depicts an example of an architecture for a light-field camera for implementing the methods of the present disclosure according to one embodiment.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and sensor 203) so as to facilitate acquisition, capture, sampling of, recording, and/or obtaining light-field image data via sensor 203. Referring now also to FIG. 4, there is shown an example of an architecture for a light-field camera 200 for implementing the method of the present disclosure according to one embodiment. The Figure is not shown to scale. FIG. 4 shows, in conceptual form, the relationship between aperture 212, main lens 213, microlens array 202, and sensor 203, as such components interact to capture light-field data for subject 401. In alternative embodiments, light-field images may be captured through the use of camera systems that do not use a microlens array. For example, in some embodiments, a camera array, a stereoscopic or multiscopic camera, or the like, may be used to generate a light-field image in which at least some information regarding the origin of captured light is recorded.

In at least one embodiment, light-field camera 200 may also include a user interface 205 for allowing a user to provide input for controlling the operation of camera 200 for capturing, acquiring, storing, and/or processing image data.

Similarly, in at least one embodiment, post-processing system 300 may include a user interface 305 that allows the user to provide input to control and/or activate depth-based image processing, as set forth in this disclosure. The user interface 305 may facilitate the receipt of user input from the user to establish one or more parameters of the image processing process.

In at least one embodiment, light-field camera 200 may also include control circuitry 210 for facilitating acquisition, sampling, recording, and/or obtaining light-field image data. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200, such as the post-processing system 300.

For example, camera 200 and/or the post-processing system 300 may store raw light-field image data, as output by sensor 203, and/or a representation thereof, such as a compressed image data file. In addition, as described in related U.S. Utility application Ser. No. 12/703,367 for "Light-field Camera Image, File and Configuration Data, and Method of Using, Storing and Communicating Same,", filed Feb. 10, 2010, memory 211 can also store data representing the characteristics, parameters, and/or configurations (collectively "configuration data") of device 209.

In at least one embodiment, captured image data is provided to post-processing circuitry 204. Such circuitry 204 may be disposed in or integrated into light-field image data acquisition device 209, as shown in FIG. 2, or it may be in a separate component external to light-field image data acquisition device 209, such as the post-processing system 300 of FIG. 3. Such separate component may be local or remote with respect to light-field image data acquisition device 209. Any suitable wired or wireless protocol can be used for transmitting image data 221 to circuitry 204; for example camera 200 can transmit image data 221 and/or other data via the Internet, a cellular data network, a WiFi network, a Bluetooth communication protocol, and/or any other suitable means.

The post-processing system 300 may include any of a wide variety of computing devices, including but not limited to computers, smartphones, tablets, cameras, and/or any other device that processes digital information. The post-processing system 300 may include additional features such as a user input 215 and/or a display screen 216. If desired, light-field image data may be displayed for the user on the display screen 216.

Overview

Light-field images often include a plurality of projections (which may be circular or of other shapes) of aperture 212 of camera 200, each projection taken from a different vantage point on the camera's focal plane. The light-field image may be captured on sensor 203. The interposition of microlens array 202 between main lens 213 and sensor 203 causes images of aperture 212 to be formed on sensor 203, each microlens in microlens array 202 projecting a small image of main-lens aperture 212 onto sensor 203. These aperture-shaped projections are referred to herein as disks, although they need not be circular in shape. The term "disk" is not intended to be limited to a circular region, but can refer to a region of any shape.

Figure 1:
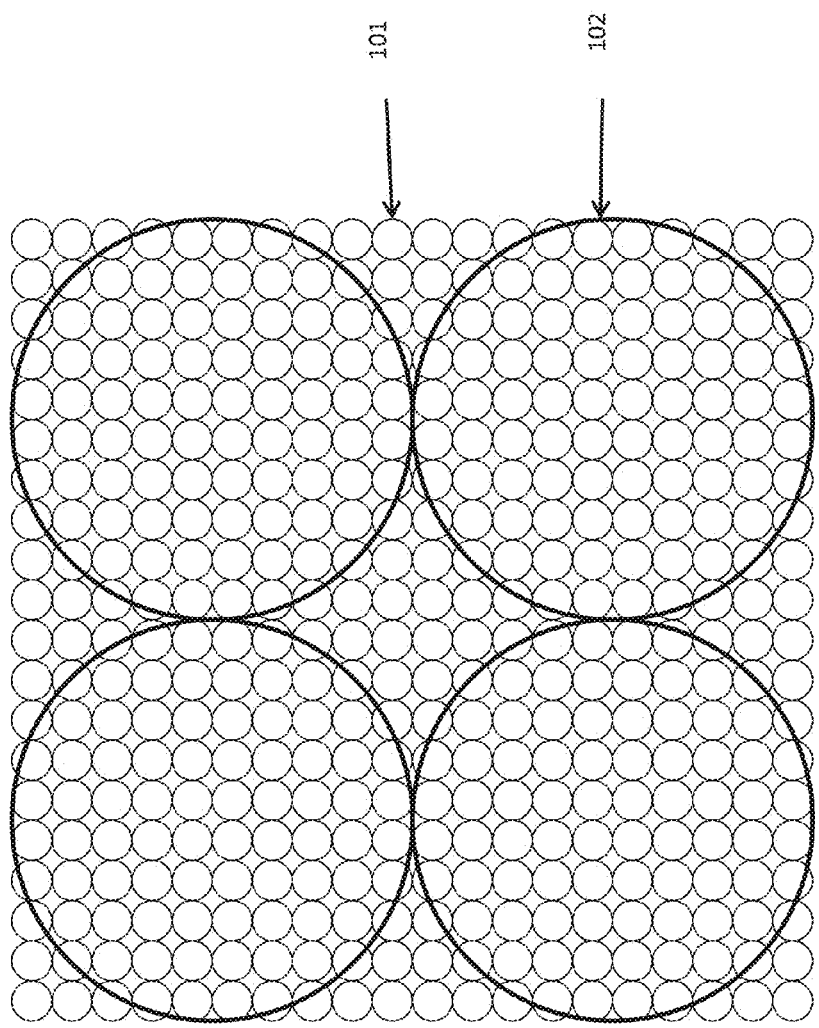
FIG. 1 depicts a portion of a light-field image.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 101; for illustrative purposes, each disk 102 is ten pixels 101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing,", filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. Examples of such techniques, including for example modulation, demodulation, and demosaicing, are described in related U.S. application Ser. No. 13/774,925 for "Compensating for Sensor Saturation and Microlens Modulation During Light-Field Image Processing", filed Feb. 22, 2013, the disclosure of which is incorporated herein by reference.

In particular, processing can be performed on enhanced depth-of-field (EDOF) image in which all parts of the image are in focus. However, such processing steps may be of limited use in conventional operation on EDOF images, because the depth map accuracy as well as the light-field data itself can have strong depth-dependent variation in terms of sampling, prefiltering, and noise level. Processing the entire EDOF output as a single 2D image can result in unwanted artifacts, especially when highly spatially-unstable processing techniques are used in enhancing the image. Accordingly, in at least one embodiment, a layered image processing technique is used.

Effect Application

There are many effects that can beneficially be applied based on the depth of objects in the image. For example, it may be desirable to replace the background or foreground of an image, or to simulate the presence of an additional light source that only illuminates objects closer to or further from the camera.

Application of effects to images such as light-field images may be visualized within the architecture of an effect container. An effect container may be a virtual container in which one or more effects can be stored. The effects in an effect container may be applied in concert with each other in a manner that expedites effect application, provides synergy between effects, and/or reduces computation time.

Figure 5:
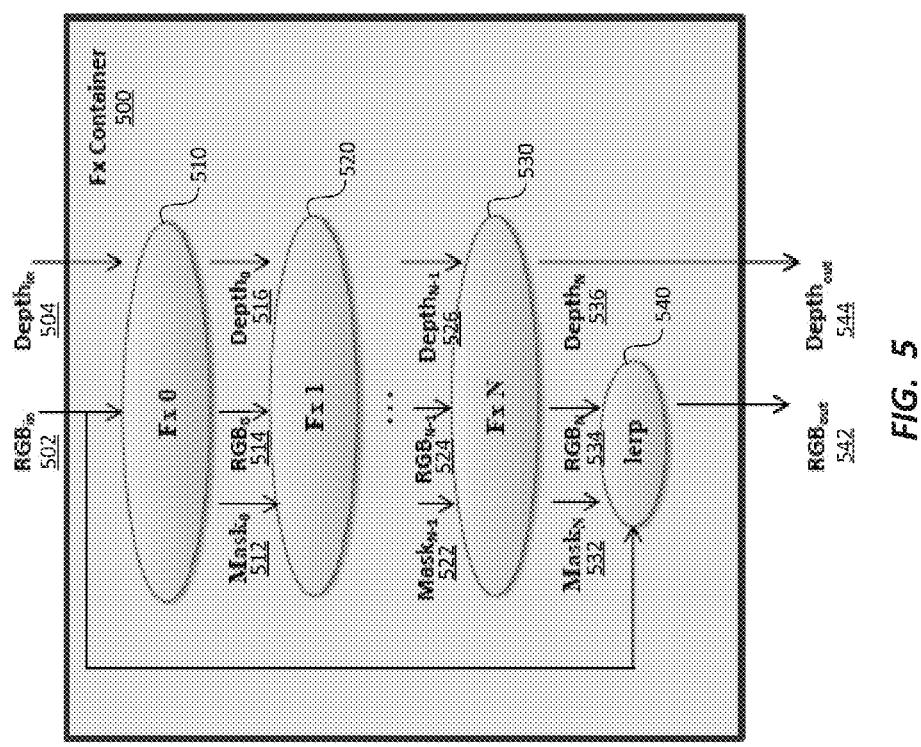
FIG. 5 is a schematic block diagram indicating how multiple effects may be applied within an effects container.

FIG. 5 is a schematic block diagram indicating how multiple effects may be applied within an effects container 500. By way of example, the effects container 500 may encapsulate a first effect 510, a second effect 520, and a third effect 530. Each of the first effect 510, the second effect 520, and the third effect 530 may have, as inputs, an image (labeled "RGB," which may stand for "RGB A Z" and/or any other known imaging format), a depth map, and/or a mask. Each of these inputs may also be outputs provided by each of the first effect 510, the second effect 520, and the third effect 530. A linear interpretation (lerp) function 540 may be carried out after application of the first effect 510, the second effect 520, and the third effect 530, so as to ensure that transitions among affected regions are smooth.

Each of the first effect 510, the second effect 520, and the third effect 530 may pass the input image, depth map, and/or mask unchanged, or may generate a new image, depth map, and/or mask. Effects may be chained together so that the output of one effect becomes the input to another effect.

Specifically, as shown in FIG. 5, the first effect 510 may receive, as inputs, a first image 502 and a first depth map 504. The first effect 510 may provide, as outputs, a first mask 512, a second image 514, and a second depth map 516. The first effect 510 may generate the first mask 512, and may modify the first image 502 and/or the first depth map 504 to generate the second image 514 and/or the second depth map 516, respectively. Additionally or alternatively, the first effect 510 may pass through the first image 502 and/or the first depth map 504 so that these become the second image 514 and/or the second depth map 516, respectively.

Similarly, the second effect may receive the first mask 512, the second image 514, and the second depth map 516 as inputs, and may provide a second mask 522, a third image 524, and a third depth map 526 as outputs. Each of these may be modified from their counterpart inputs to the second effect 520, or may be the same (i.e., a passed-through versions) of their counterpart inputs.

Further, the third effect may receive the second mask 522, the third image 524, and the third depth map 526 as inputs, and may provide a third mask 532, a fourth image 534, and a fourth depth map 536 as outputs. Each of these may be modified from their counterpart inputs to the third effect 530, or may be the same (i.e., a passed-through versions) of their counterpart inputs.

Finally, the first image 502, third mask 532, and the fourth image 534 may be passed to the lerp function 540 as inputs. The lerp function 540 may use linear interpolation and the third mask 532 to blend between the first image 502 and the fourth image 534; alternatively, any other suitable blending technique can be used. Where the third mask 532 is a function of depth, the user may apply the first effect 510, the second effect 520, and/or the third effect 530 as functions of depth (for example, based on the fourth depth map 536). The result may be provision of a processed image 542 and a processed depth map 544, in which all effects of the effects container 500 (i.e., the first effect 510, the second effect 520, and the third effect 530) are present.

Several examples of potential effects, with corresponding outputs, will be provided below. These exemplary effects may be utilized in the context of an effects container like that of FIG. 5, and will be described as though the exemplary effect is taking the place of the second effect 520 of FIG. 5.

According to a first example, an exposure effect may apply a multiplication operation to the input image (the second image 514), for example, multiplying the intensity of each pixel of the second image 514. The resulting image may be the output image (the third image 524), while the first mask 512 may be passed through as the second mask 522 and the second depth map 516 may be passed through as the third depth map 526.

According to a second example, an effect may create a mask (the second mask 522) from the input depth map (the second depth map 516). The second image 514 may be passed through as the third image 524 and the second depth map 516 may be passed through as the third depth map 526.

According to a third example, an effect may implement an image insert effect in the form of a background replacement to replace the background of an input image (the second image 514) with a different background. This modification may be made as a function of depth (the second depth map 516), and may be provided as the third image 524. The second depth map 516 may be modified to create the third depth map 526 in which the depth of at least some of the pixels of the third image 524 are forced to a certain depth. The first mask 512 may be passed through as the second mask 522.

According to a fourth example, an effect may implement a background desaturation filter in which foreground objects are in color and background objects are in monochrome. The input image (the second image 514) may be modified to generate the output image (the third image 524) through the use of the input mask (the first mask 512) and the input depth map (the second depth map 516). These optionally may not be modified, and may thus be passed through as the second mask 522 and the third depth map 526, respectively.

According to a fifth example, a mask may be created as a function of both spatial coordinates (x, y) and depth (z). The user may have three-dimensional control over where the effect is to be applied. As an example, a simple exposure effect may be combined with a sphere-functioned mask such as a radial mask (i.e., the mask is a function of the distance from the coordinates (x, y, and z) of the pixel and the sphere may give the effect of placing a light-object into the scene of the image. The user may control the coordinates (x, y, and z) of the light. Again, the input image (the second image 514) may be modified to generate the output image (the third image 524) through the use of the input mask (the first mask 512) and the input depth map (the second depth map 516). These optionally may not be modified, and may thus be passed through as the second mask 522 and the third depth map 526, respectively.

If desired, effects may be stored in multiple effects containers. Each effects container may resolve its effects independently of the effects within other effects containers. Thus, effects may beneficially be grouped in effects containers to provide synergies between the results of application of effects, reduce processing time required to apply the effects, and/or the like.

Figure 6:
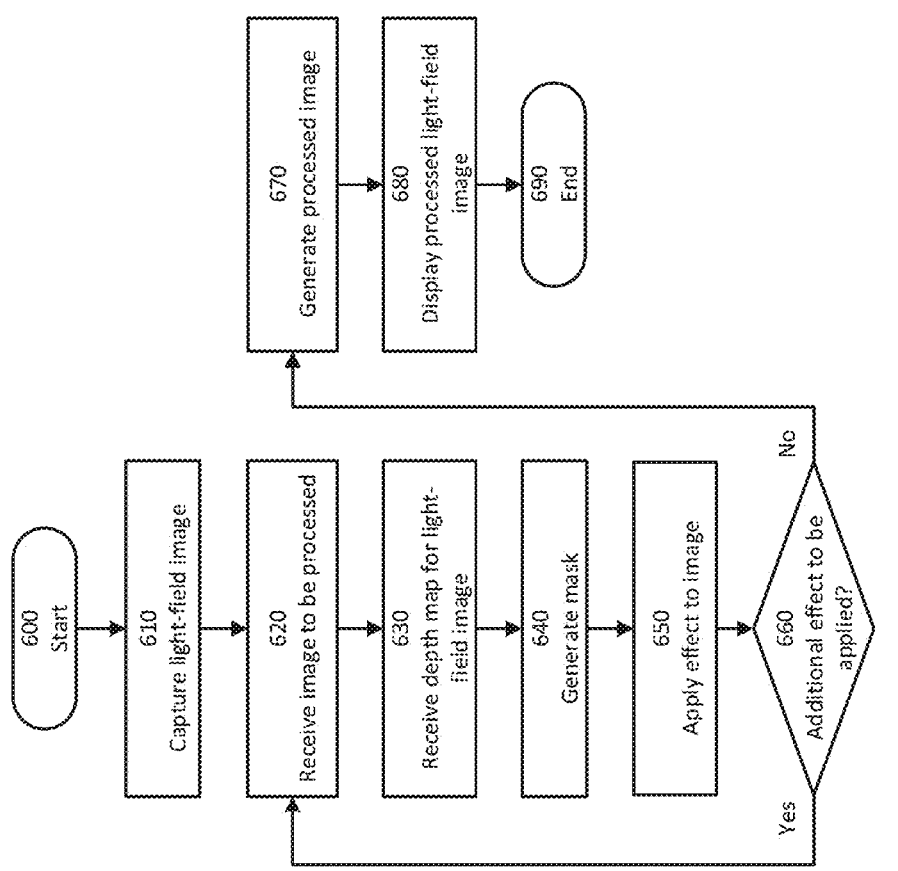
FIG. 6 is a flow diagram depicting a method of carrying out depth-based application of one or more effects, according to one embodiment.

FIG. 6 is a flow diagram depicting a method of carrying out depth-based application of one or more effects, according to one embodiment. The method may be performed, for example, with circuitry such as the post-processing circuitry 204 of the camera 200 of FIG. 2 or the post-processing circuitry 204 of the post-processing system 300 of FIG. 3, which is independent of the camera 200. In some embodiments, a computing device may carry out the method; such a computing device may include one or more of desktop computers, laptop computers, smartphones, tablets, cameras, and/or other devices that process digital information.

The method may start 600 with a step 610 in which the light-field image is captured, for example, by the sensor 203 of the camera 200. The light-field image may be received in a computing device, which may be the camera 200 as in FIG. 2. Alternatively, the computing device may be separate from the camera 200 as in the post-processing system 300 of FIG. 3, and may be any type of computing device, including but not limited to desktop computers, laptop computers, smartphones, tablets, and the like.

In a step 620, the image to be processed (for example, the first image 502 of FIG. 5) may be received by the computing device. The first image 502 may be the raw light-field image captured by the camera 200, or alternatively, may be an image derived from the raw light-field image. The first image 502 may thus be a four-dimensional light-field image with pixels described in terms of (x, y) and (u, v) as described above. Alternatively, the first image 502 may be a two-dimensional image, such as a projection obtained by processing the raw light-field image. Thus, the first image 502 may have only (x, y) coordinates.

In a step 630, a depth map (for example, the first depth map 504) for the light-field image may also be received by the computing device. The first depth map 504 may be generated by the camera 200 or by a different computing device, such as the post-processing system 300 of FIG. 3. Generation of the first depth map 504 may be accomplished through the use of a wide variety of algorithms, based on the four-dimensional light-field information captured through the use of microlens array 202.

In a step 640, a mask may be generated. The step 640 may, for example, represent application of the first effect 510 of FIG. 5, with the purpose of creating the first mask 512 through the use of the first depth map 504. The first image 502 and the first depth map 504 may be passed through, unchanged, to provide inputs (for example, the second image 514 and the second depth map 516, respectively) for subsequent steps. The step 640 is optional; in the event that the effect to be applied subsequently does not require the use of a mask (or the user elects not to use a mask to apply the effect), the step 640 may be omitted.

In a step 650, an effect may be applied to the image. The step 650 may, for example, represent application of the second effect 520 of FIG. 5, with the purpose of modifying the second image 514 to provide the third image 524. Application of the second effect 520 to the second image 514 may be limited by the first mask 512, which may indicate, within the second image 514, one or more regions to which the second effect 520 is to be fully applied, one or more regions to which the second effect 520 is not to be applied, and/or one or more regions to which the second effect 520 is to be only partially applied.

The first mask 512 may further indicate the degree to which the second effect 520 is to be applied to regions to which it is to be partially applied. For example, the first mask 512 may specify a number ranging from 0 to 1, where 1 represents full applicability of the second effect 520, and 0 represents no applicability. The second effect 520 may be applied to the pixel in proportion to the number. In some embodiments, the number may act as a weight that controls application of the second effect 520, for example, via multiplication of the number by a value representing the change to be made to the second image 514 through application of the second effect 520. For example, if the second effect 520 is to multiply the luminance values of pixels of the second image 514 by a multiplier to increase the exposure level of the second image 514, the multiplier may, for each pixel, also be multiplied by the weight assigned to that pixel by the first mask 512 to obtain the degree to which the multiplier is applied to that pixel. In some embodiments, each mask (for example, the first mask 512) may simply blend two images. However, if desired, the depth of the pixels may further be taken into account in the blending process, in addition to or in the alternative to application of the mask.

Thus, the step 650 may provide very flexible application of effects to images. The user may use the first mask 512 to determine the degree to which the second effect 520 is to be applied to each portion of the second image 514. The second depth map 516 may facilitate the construction of the first mask 512 in a manner that helps the user to precisely, and yet rapidly and easily, indicate how the second effect 520 is to be applied to the second image 514.

In a query 660, a determination may be made as to whether one or more additional effects are to be applied. The query 660 may be answered by the user, for example, via selecting an option to add another effect, or selecting an option to exit the effect application user interface. If one or more additional effects are to be applied, the method may return to the step 620, in which the image to be processed is received. The steps 620, 630, 640, and 650 may be repeated until the query 660 is answered in the negative.

For example, with reference to FIG. 5, if the second effect 520 was applied in the step 650, repetition of the step 620 may entail retrieval of the third image 524, which may have been modified or passed through in the step 650, depending on the type of effect applied. This may be followed by the step 630, in which the depth map is received. This may entail retrieval of the third depth map 526, which may have been modified or passed through in the step 650, depending on the type of effect applied.

This may be followed by the step 640, in which the mask is generated. As indicated above, a new mask may not need to be generated. Thus, performing the step 640 again may entail retrieval of a previously generated mask, such as the second mask 522. As also indicated previously, the step 640 is optional and may be omitted in the event that a mask is not needed for subsequent effect application.

The step 650 may then be repeated, for example, by applying the third effect 530. As with the previous iteration of the step 650, application of the third effect 530 may optionally be limited by the second mask 522. The query 660 may then be repeated.

Once no further effects are to be applied, the method may proceed to a step 670 in which the processed image is generated. As indicated previously, this may optionally be done by implementing all of the effects in an effects container prior to generation of the output image. The lerp function 540 (or other suitable function) may be applied to blend all effects into a single processed image. Additionally or alternatively, rather than applying all of the effects prior to generation of an output image, effects may be applied singly, with a new, complete output image produced after application of each effect. In such a case, the step 670 may simply use the last output image generated as the processed image for display.

As indicated previously, effects may be stored in multiple effects containers. In some examples, the step 670 may include resolution of effects from multiple effects containers. This may be done, for example, where there are two effects containers, by generating a processed image in which the effects from the first effects container are present, and then using this processed image as the input for the second effects container. A new processed image may then be generated via application of the effects of the second container. Thus, in the new processed image, the effects from both containers may be present.

In a step 680, the processed light-field image may be displayed for the user. This may be done, for example, by displaying the processed light-field image on a display screen such as the display screen 216 of FIG. 3. The method may then end 690.

The method of FIG. 6 is only one of many possible methods that may be used to apply effects to images such as light-field images. According to various alternatives, various steps of FIG. 6 may be carried out in a different order, omitted, and/or replaced by other steps. For example, other image processing steps such as color space conversion, blurring, Automatic White Balance (AWB) algorithms and/or any other image processing steps set forth above may be incorporated into the method of FIG. 6, at any stage of the method, and may be carried out with respect to the image prior to, during, and/or after application of effects.

The method may help the user rapidly and easily apply effects to images such as light-field images, with the option of using depth information to facilitate and enhance effect application. Examples of how this may be accomplished in the context of an exemplary user interface will be shown and described in connection with FIGS. 7 through 14, as follows.

User Interface Examples

Figure 7:
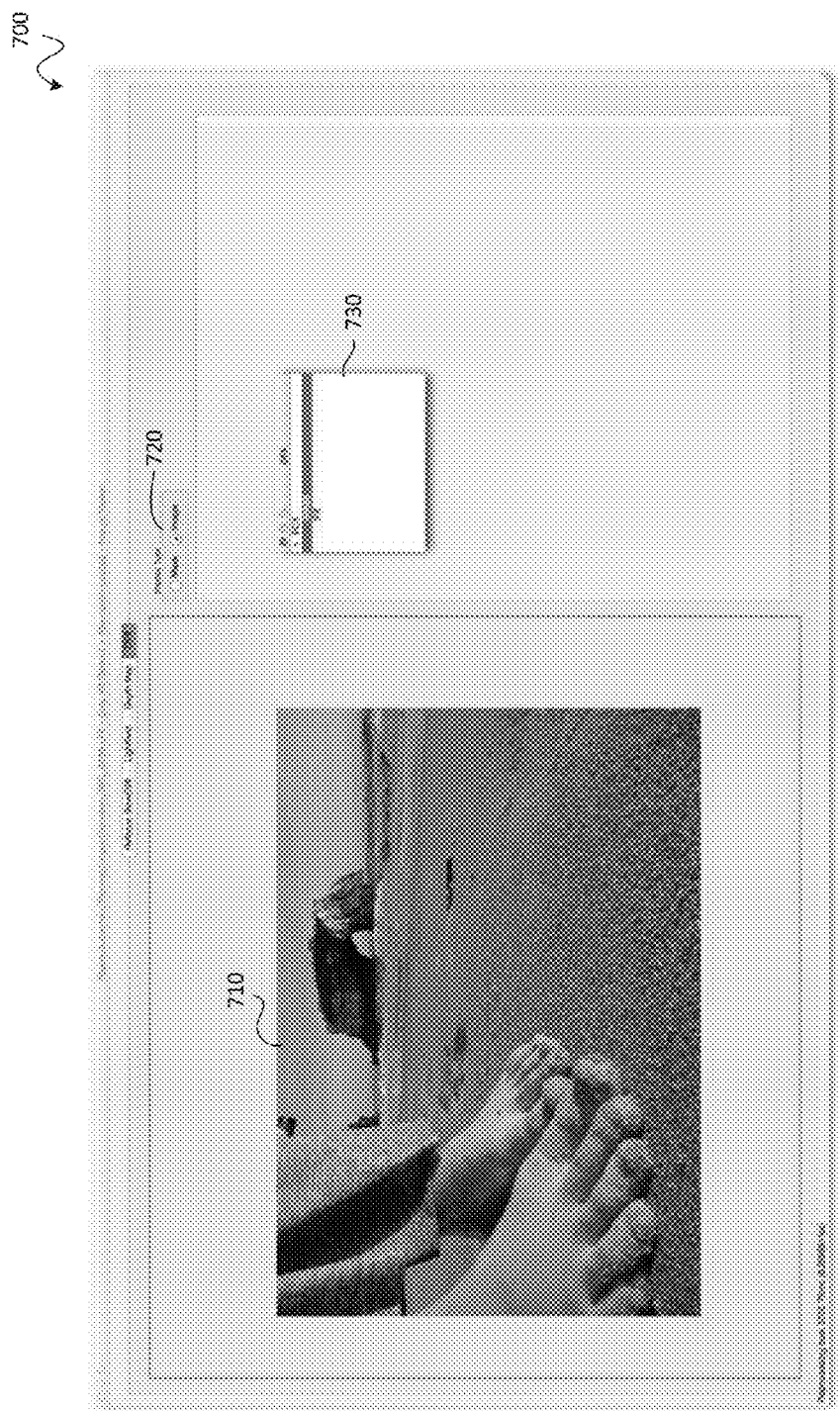
FIG. 7 is a screenshot diagram depicting initiation of processing of an image, according to one embodiment.

FIG. 7 is a screenshot diagram 700 depicting initiation of processing of an image 710, according to one embodiment. The screenshot diagram 700 illustrates the use of a user interface that facilitates application of effects to the image 710. The image 710 may be a light-field image, or may be obtained via initial processing of a light-field image. In an alternative embodiment, image 710 may be any other type of image, and need not be a light-field image.

The user interface may include a viewport selector 720 with "mask" and "image" radio buttons that can be used to control whether the image 710 itself is displayed in the viewport on the left, or whether an associated mask is instead displayed. The user interface may also include an effects toolbox 730 in which a user can select whether to create a mask or apply an effect.

Figure 8:
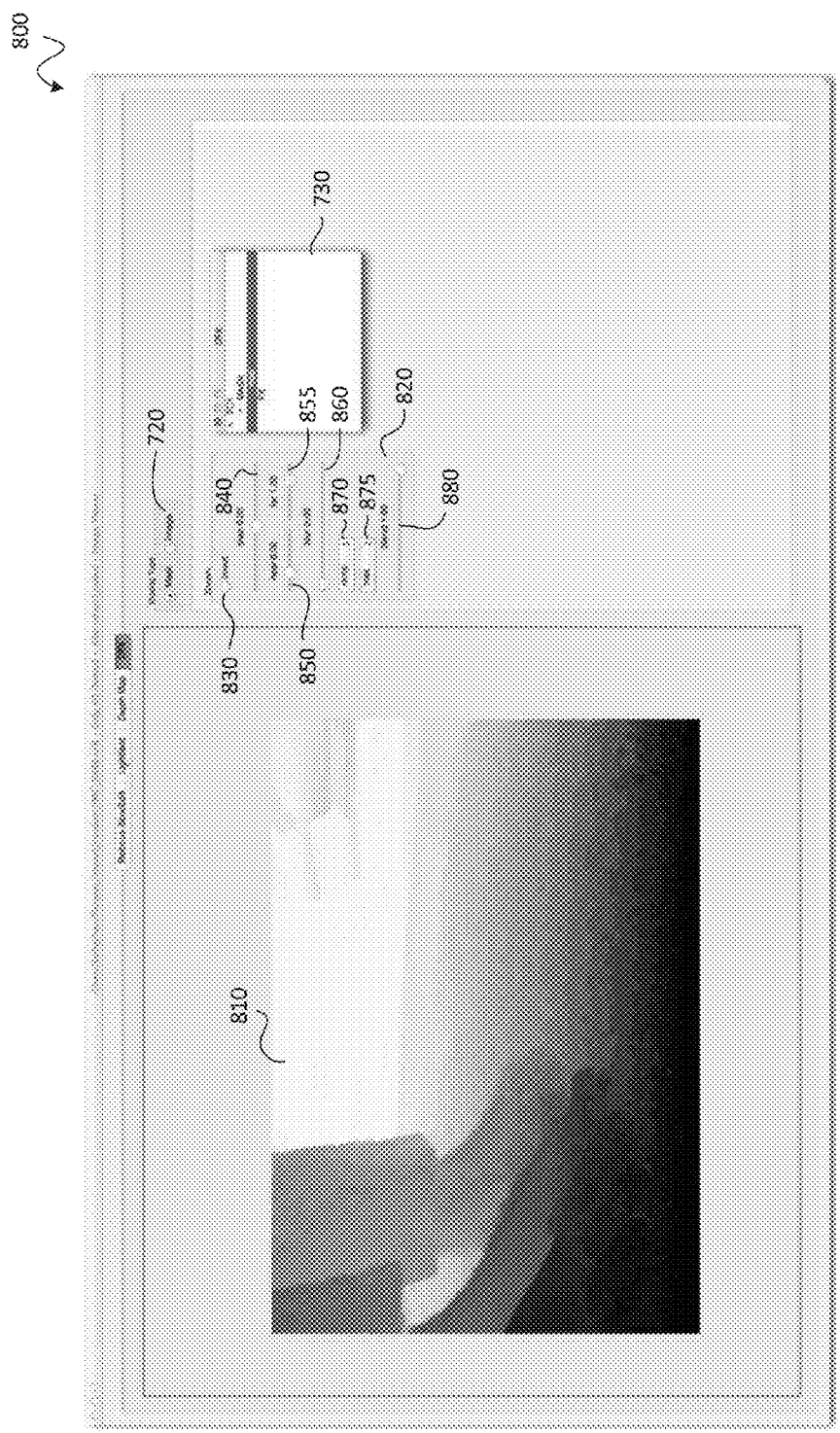
FIG. 8 is a screenshot diagram depicting a mask for the image of FIG. 7, generated through the use of a linear ramp function, according to one embodiment.

FIG. 8 is a screenshot diagram 800 depicting a mask 810 for the image 710 of FIG. 7, generated through the use of a linear ramp function, according to one embodiment. The mask 810 may be generated through the use of the depth values of the image 710. As shown, the viewport selector 720 has been changed to "mask" to cause the mask 810 to be displayed. Selection of the mask in the effects toolbox 730 may initiate the display of a mask parameter toolbox 820. In the mask 810, areas that are white may be areas in which the associated effect is to be applied fully. Areas that are black may be areas in which the associated affect is not to be applied at all. Areas that are gray may be areas in which the associated effect is to be applied partially, in proportion to the lightness (i.e., proximity to white) of the gray used. As shown, the mask 810 may have a gradual transition between black and white areas, through the use of gray areas of varying intensity. In other embodiments, other color-coding or visual techniques can be used to represent the mask 810.

The mask parameter toolbox 820 may have several options that can be used to modify the mask 810. These parameters may be modified by the user to control how the associated effect will be applied. The results of modifications may be visible as changes in the mask 810.

For example, an invert box 830 may be used to swap colors of the mask 810 so that light areas become dark and dark areas become light. Thus, where the mask 810 currently has the effect applied with increasing strength toward the background of the image 710, selecting the invert box 830 may cause the opposite to occur, i.e., the effect to be applied with increasing strength toward the foreground of the image 710.

Further, a bias slider 840 may be used to control the shape of the function to be applied to the mask 810. A near slider 850 and a far slider 855 may be used to provide minimum and/or maximum depths, respectively, at which the effect will be applied to the image 710. For example, increasing the near slider 850 may raise the minimum depth, causing more black pixels to appear toward the foreground of the mask 810. Conversely, decreasing the far slider 855 may reduce the maximum depth, causing more white pixels to appear toward the background of the mask 810. The result of either change may be a reduction in the size of the gradient-based, grayscale region. Setting the near slider 850 to 0 and the far slider 855 to 1, as in FIG. 8, may permit the gradient-based, grayscale region to occupy the entire mask 810.

Yet further, a blur slider 860 may be used to blur the mask 810, thereby mitigating sharp boundaries in application of the associated effect. A function selector 870 may be used to select the type of function that will be applied to the depth map to generate the mask 810. In some embodiments, the function selector 870 may enable the user to choose between functions such as, but not limited to, the following:

- A ramp function that provide a linear gradient, for example, by running the depth map through a limiting function (ramp) that provides a gradient from near to far or far to near;
- A bell function that provides a bell-shaped transition, which may be particularly suited to applying a rise and fall with increasing or decreasing depth (for example, moving from near to far, providing increasing application of the effect, followed by decreasing application of the effect, or vice versa); and
- A radial function that provide a radial transition that is affected not just by the depth of a pixel in the depth map, but also by the x and y coordinates of the pixel within the image, which may facilitate user designation of spatial coordinates (x, y) that affect generation of the mask, in addition to the depth (z). The radial transition may be shown as a three-dimensional sphere, but may be implemented as a two-dimensional circle in the (x, y) domain with a bell curve applied along the depth (z), to expedite computation.

These are merely exemplary functions. Those of skill in the art, with the aid of the present disclosure, will recognize that many other mathematical functions may be used to generate a mask with inputs based on a depth map, user selection of depth and/or spatial coordinates, and/or the previous mask. In the function selector 870 of FIG. 10, "ramp" has been selected, representing the use of a ramp function to generate the mask 810.

Yet further, the mask parameter toolbox 820 may have an additional selector 875 that may be used to select further parameters of generation of the mask 810. Further, the mask parameter toolbox 820 may have a blend slider 880 that may be used to control the degree of blending to be used in generation of the mask 810 and/or application of the corresponding effect.

Figure 9:
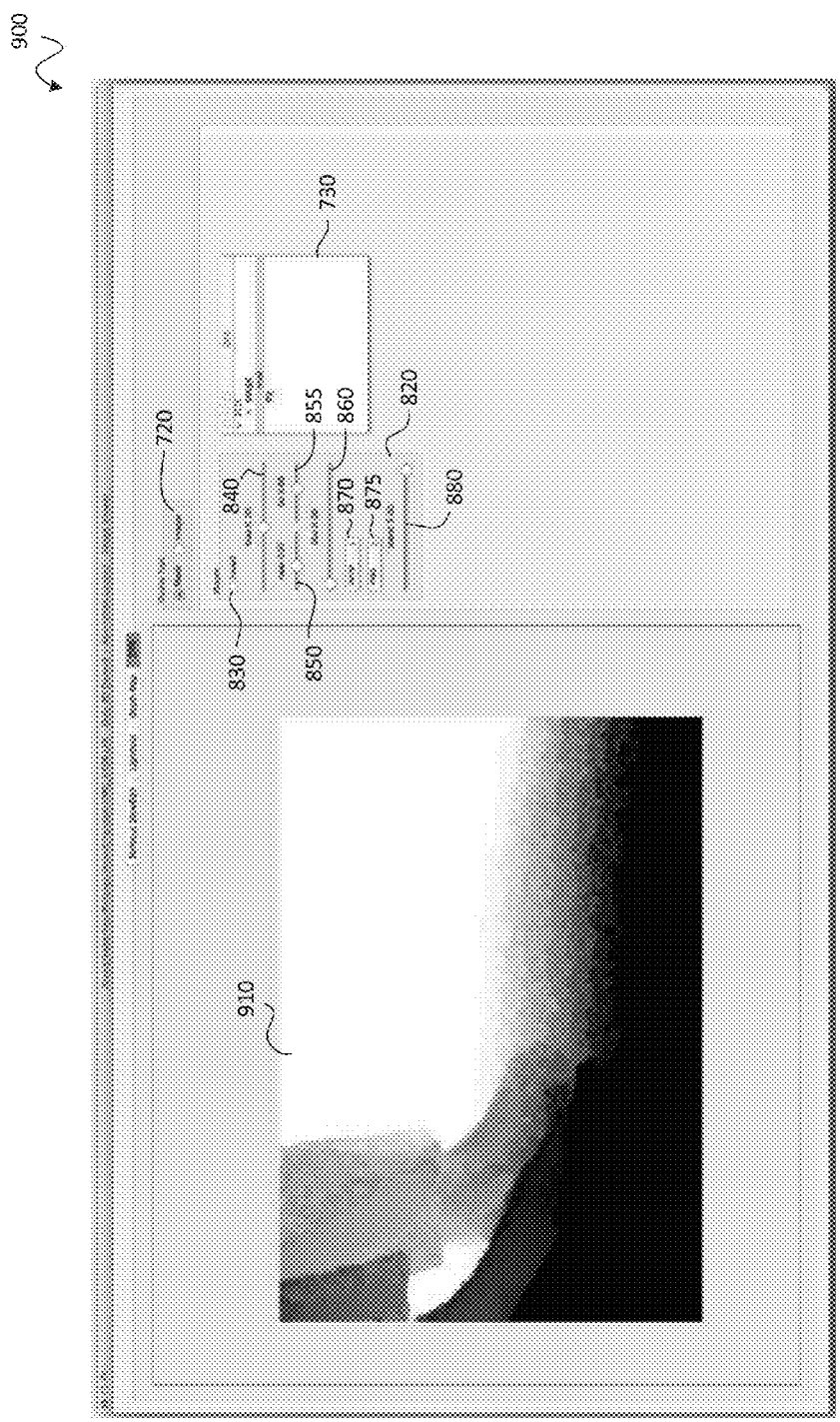
FIG. 9 is a screenshot diagram depicting the mask of FIG. 8 after alteration of the "near" and "far" parameters, according to one embodiment.

FIG. 9 is a screenshot diagram 900 depicting the mask 810 of FIG. 8 after alteration of the "near" and "far" parameters, according to one embodiment. The result is the generation of a mask 910 as shown in FIG. 9. More particularly, the user has increased the near slider 850 by moving it to the right, and decreased the far slider 855 by moving it to the left. The result is that in the mask 910, the black now encompasses a greater portion of the foreground, and the white now encompasses a greater portion of the background. The grayscale gradient now occupies a narrower band in the middle of the mask 910.

Figure 10:
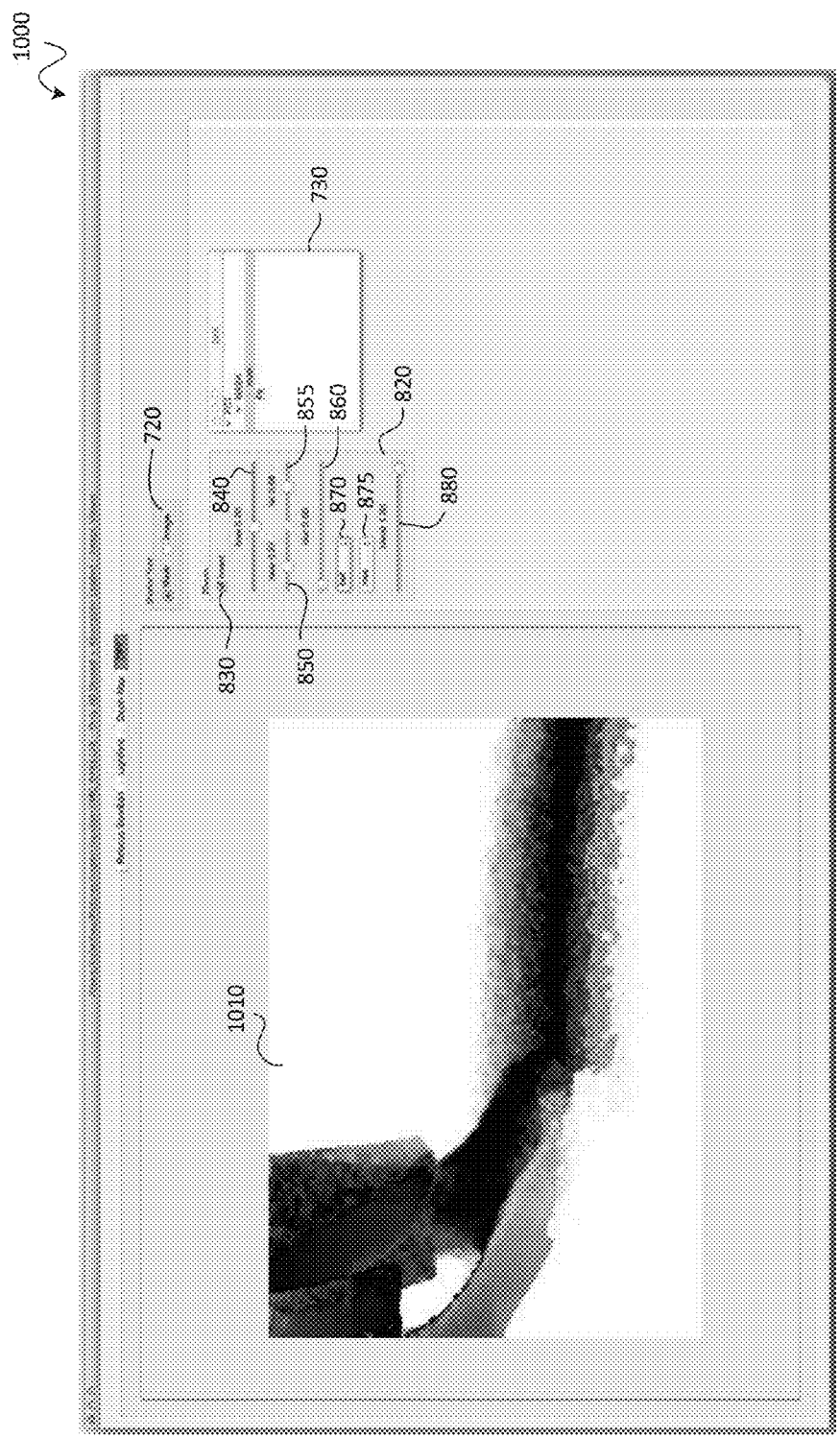
FIG. 10 is a screenshot diagram depicting the mask of FIG. 9 after inversion of the mask and selection of a bell function, according to one embodiment.

FIG. 10 is a screenshot diagram 1000 depicting the mask 910 of FIG. 9 after inversion of the mask and selection of a bell function, according to one embodiment. The result is the generation of a mask 1010 as shown in FIG. 9. As shown, the box 830 has been checked, and the function selector 870 has been changed to "bell." The result is that the foreground and background of the mask 1010 are now white, with a gradient band (falling from white to black and then rising back to white again, with increasing depth). Thus the mask 1010 may now be used to apply an effect only to the foreground and background regions of the image 710, with application of the effect falling off to zero in the medium-depth region in the middle of the image 710.

Figure 11:
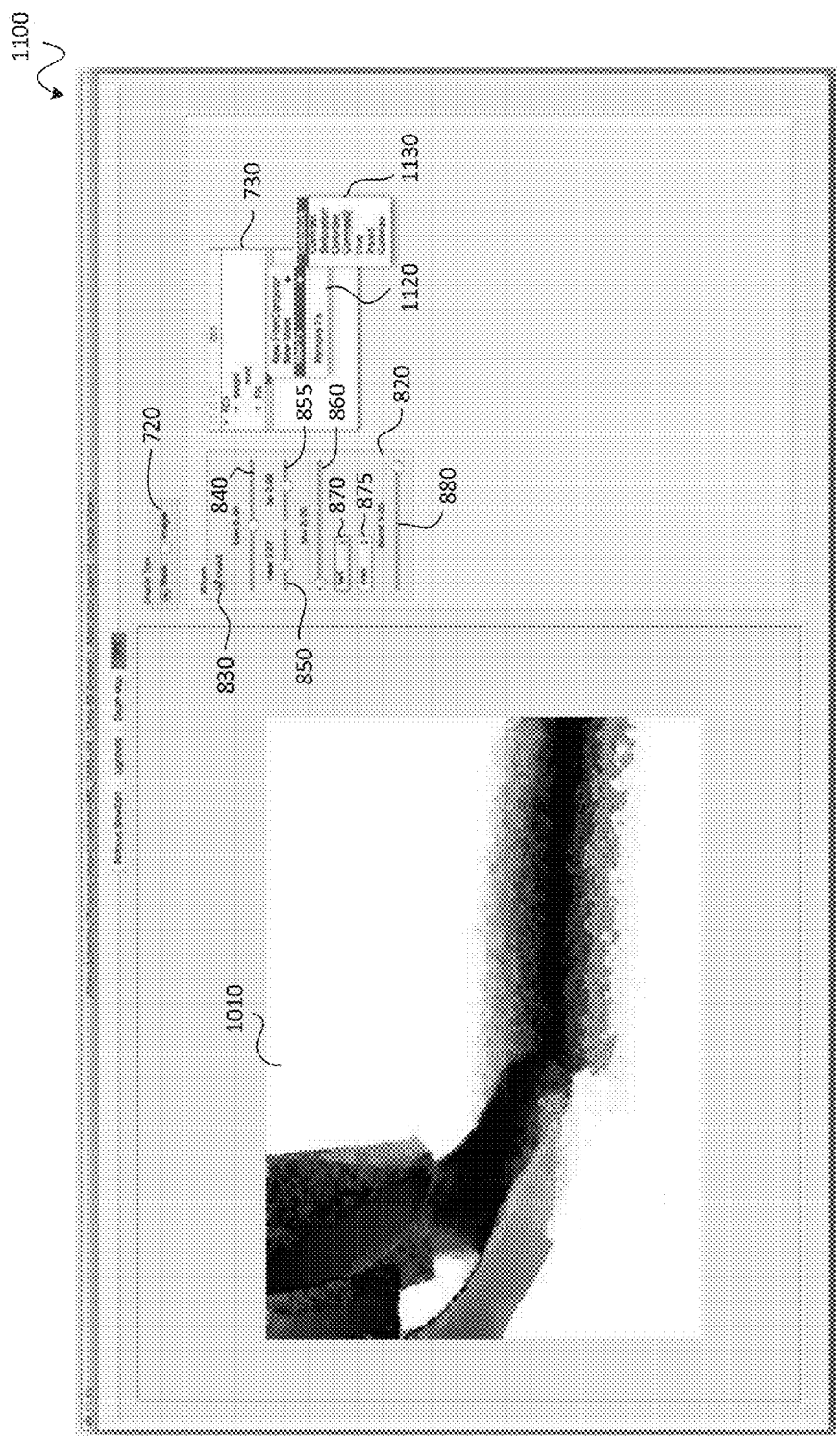
FIG. 11 is a screenshot diagram depicting the mask of FIG. 10, indicating user selection of an "Exposure" effect, according to one embodiment.

FIG. 11 is a screenshot diagram 1100 depicting the mask 1010 of FIG. 10, indicating user selection of an "Exposure" effect, according to one embodiment. This may initiate application of the exposure effect to the image 710, with the mask 1010 used to limit application of the exposure effect.

As shown in FIG. 11, the effects toolbox 730 may have an action menu 1120 that can be used to add a new effect. Selecting to add a new effect may display an effect selection menu 1130. The effect selection menu 1130 may permit the user to select what type of effect to add. The effects shown may include, but are not limited to, the following:

- An exposure effect that modifies an exposure level of the image;
- A contrast effect that modifies a contrast level of the image;
- A saturation effect that modifies a saturation level of the image; and
- A color set effect that modifies a color set of the image;
- A hue effect that modifies one or more colors of the image;
- An image insert effect that can be used to insert a different image in place of a portion of the image; and
- A colorize effect that can be used to colorize part or all of the image.

Figure 12:
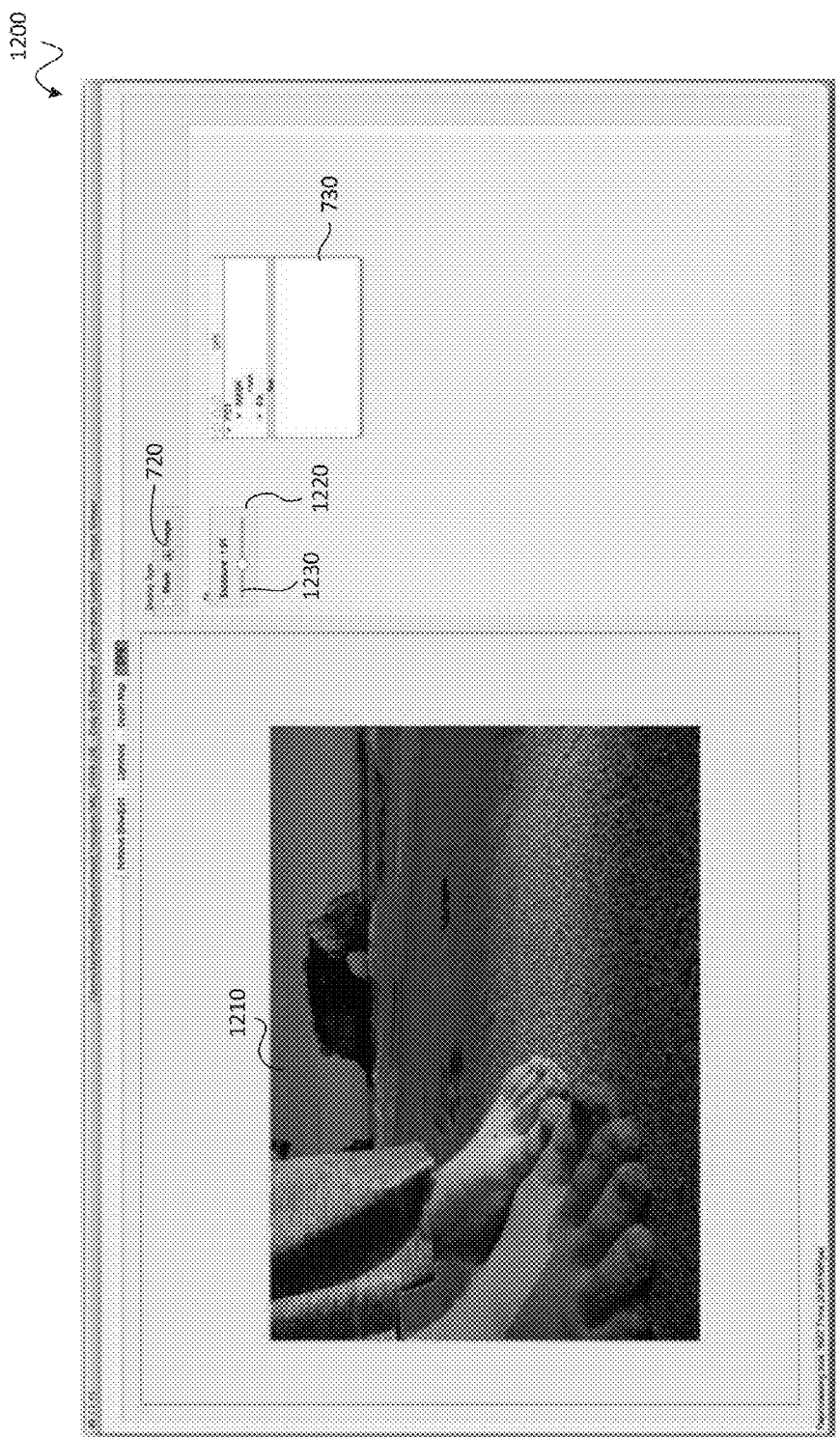
FIG. 12 is a screenshot diagram depicting the image of FIG. 7, after application of the "Exposure" effect with the mask of FIGS. 10 and 11, according to one embodiment.

FIG. 12 is a screenshot diagram 1200 depicting the image 710 of FIG. 7, after application of the "Exposure" effect with the mask 1010 of FIGS. 10 and 11, according to one embodiment. The result is the generation of an image 1210 with the exposure effect present, as limited by the mask 1010. The user may select "image" in the viewport selector 720 in order to display the image 1210 in place of the mask 1010.

As shown, selecting the "exposure" effect may cause the display of an exposure effect toolbox 1220, which may have a slider 1230 that can be used to adjust the exposure level of the image 1210. The slider 1230 may, for example, be dragged to the left to reduce the exposure level of the image 1210 (or the unmasked portions of the image 1210) or to the right to increase the exposure level of the image 1210. If desired, adjustment of the slider 1230 may cause the appearance of the image 1210 to update in real-time, thus facilitating user adjustment to the proper exposure level. Other changes to images and/or masks may similarly be shown in real-time, if desired.

As illustrated in the image 1210, the exposure level of the image 710 has been reduced in the unmasked portions (i.e., the foreground and background regions), so that the image 1210 now appears to have been captured in darker conditions, with a ray of light shining generally horizontally across the center of the image 1210. As indicated previously, a mask may be generated through the use of user selections based on (x, y) coordinates in addition to or in place of depth (z) coordinates. Thus, the user may control the location of the lighter portion of the image 1210 so that the lighter portion is not positioned solely based on the depth of the objects in the image 710. This may be done by modifying the mask 1010, for example, through the application of a different function such as a radial function.

Figure 13:
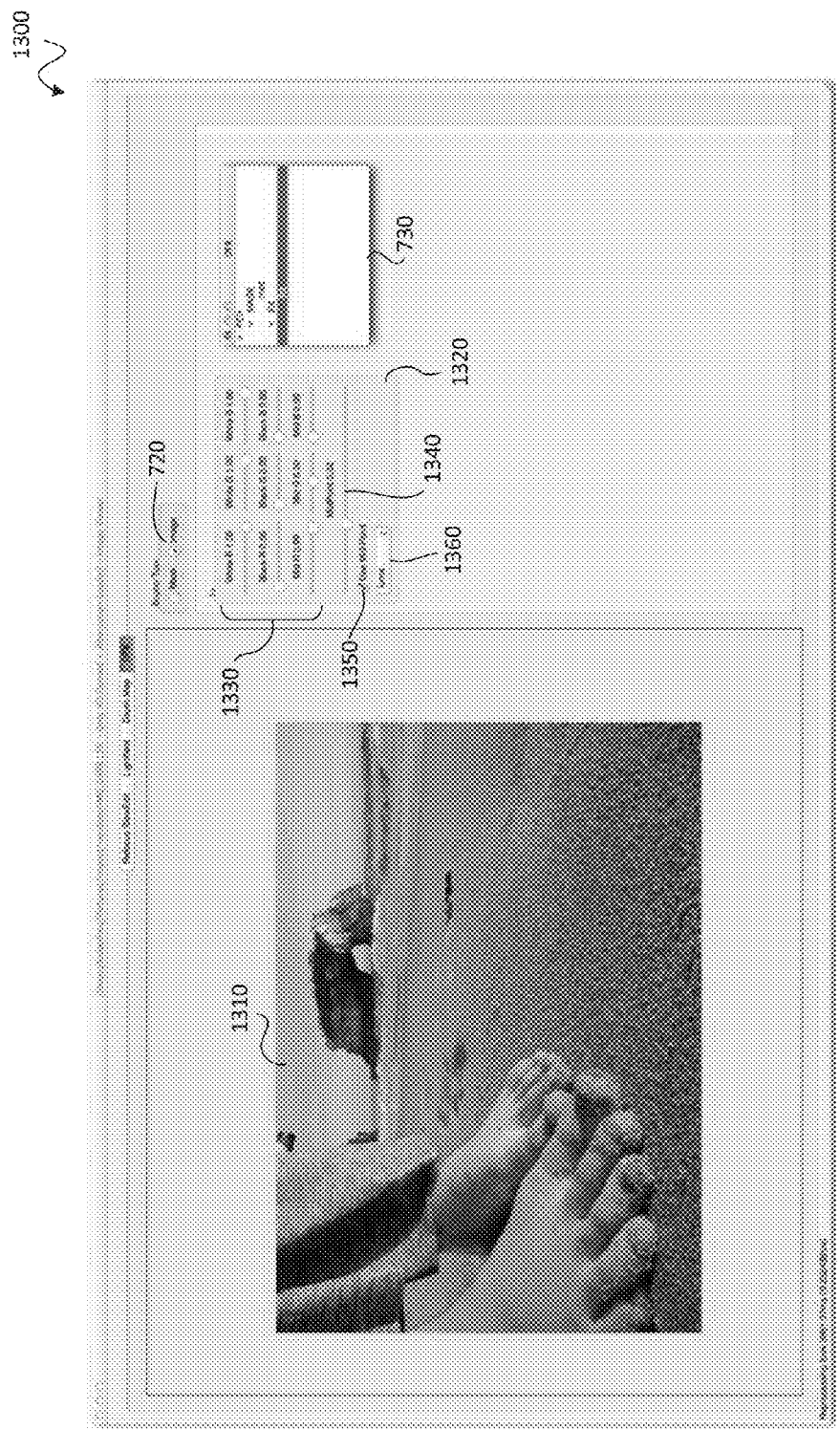
FIG. 13 is a screenshot diagram depicting the image of FIG. 7, after application of a "Colorization" effect with a mask generated by application of a linear ramp function, according to one embodiment.

FIG. 13 is a screenshot diagram 1300 depicting the image 710 of FIG. 7, after application of a "Colorization" effect with a mask (not shown) generated by application of a linear ramp function, according to one embodiment. The result is the generation of an image 1310 in which the colorization effect is present, as limited by the mask.

The mask may utilize a linear ramp to provide a gradient that increases applicability of the colorization effect with increasing depth. The mask may be based on depth and/or the (x, y) coordinate. The user may again select "image" in the viewport selector 720 in order to display the image 1310 in place of the mask used to apply the colorization effect.

The result may be the application of greater colorization change in the background of the image 1310 (the top portion in the example of the image 1310). Little or no colorization change may be applied to the foreground of the image 1310. This may provide the image 1310 with a more dramatic background appearance.

As shown, selecting the "colorization" effect may cause the display of a colorization effect toolbox 1320. The colorization effect toolbox 1320 may have a series of sliders 1330 that can be used to adjust colorization of the image 1310. As shown, the sliders 1330 on the left may control red colorization, the sliders 1330 in the center may control green colorization, and the sliders 1330 on the right may control blue colorization. Further, the colorization effect toolbox 1320 may have a midpoint slider 1340, a midpoint checkbox 1350, and a dropdown menu 1360, which may be used to further control depth-based or other application of the colorization effect.

Figure 14:
FIG. 14 is a screenshot diagram depicting the image of FIG. 7, after application of a "Background" effect in which a new two-dimensional background image is inserted based on a mask generated by application of a linear ramp function, according to one embodiment.

FIG. 14 is a screenshot diagram 1400 depicting the image 710 of FIG. 7, after application of an "image insert" effect in which a new two-dimensional image (for example, a background or foreground image) is inserted based on a mask generated by application of a linear ramp function, according to one embodiment. The result in the example of FIG. 14 is the generation of an image 1410 in which the background has been replaced with a different image, as limited by the mask, so that replacement only occurs in the background region, and not in the foreground. The "background" of an image may be the portion having the greatest depth from the camera. Conversely, the "foreground" of an image may be the portion having the smallest depth from the camera.

The mask may utilize a linear ramp to provide a gradient that increases applicability of the colorization effect toward the background of the image (with increasing depth). The mask may be adjusted, for example, through alteration of the maximum and/or minimum depths, as set forth in the description of FIG. 10, to provide for a narrow gradient and/or no gradient between the foreground and background regions. Thus, there may be little or no portion of the image 1410 in which the background replacement is only partially applied. The mask may be based on depth and/or the (x, y) coordinate. The user may again select "image" in the viewport selector 720 in order to display the image 1410 in place of the mask.

As shown, selecting the "image insert" effect may cause the display of a background replacement effect toolbox 1420. The background replacement effect toolbox 1420 may have a load button 1430 that can be used to load the image to be used for background replacement. Further, the background replacement effect toolbox 1420 may have an X position slider 1440, a Y position slider 1445, a scale slider 1450, and an angle slider 1460 that may be used to control the position, scale, and orientation, respectively, of the replacement image, relative to the remainder of the image 1410.

The background replacement effect may be applied based on depth. If desired, this may be done through the use of a mask that provides for full application of the background replacement effect for all pixels with a depth greater than a certain threshold, and no application of the background replacement effect for pixels that do not have a depth greater than the threshold.

Image Processing Approaches

Figure 15:
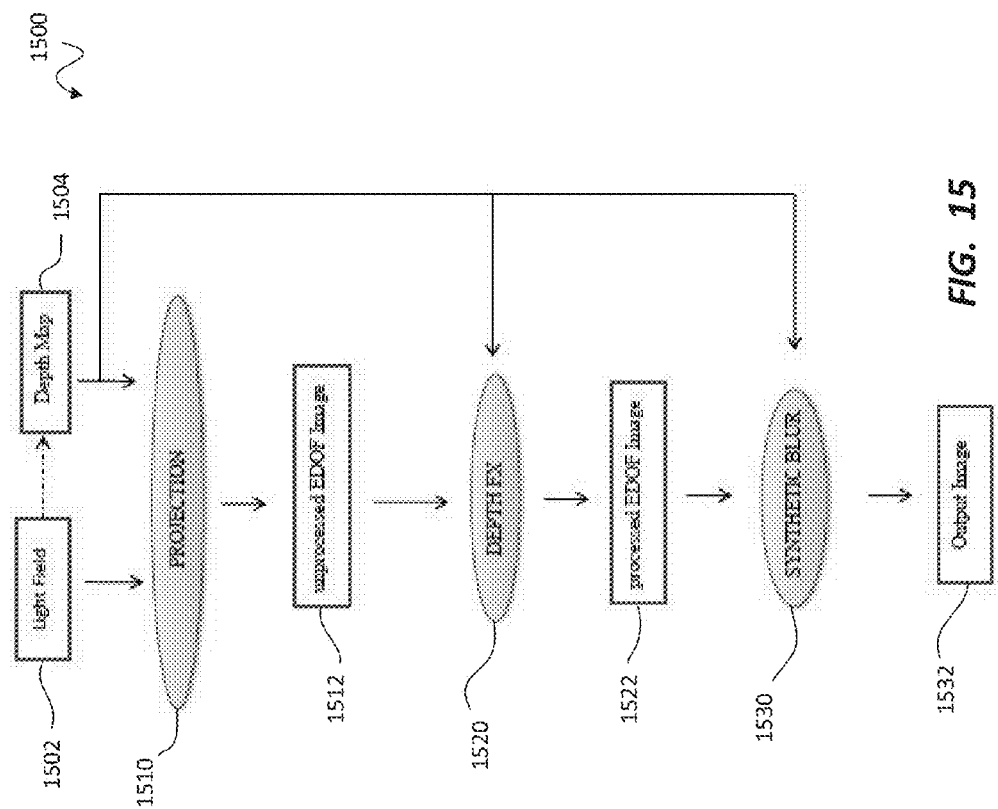
FIG. 15 is a schematic block diagram indicating how effects may be applied to a light-field image, according to a first approach.
Figure 16:
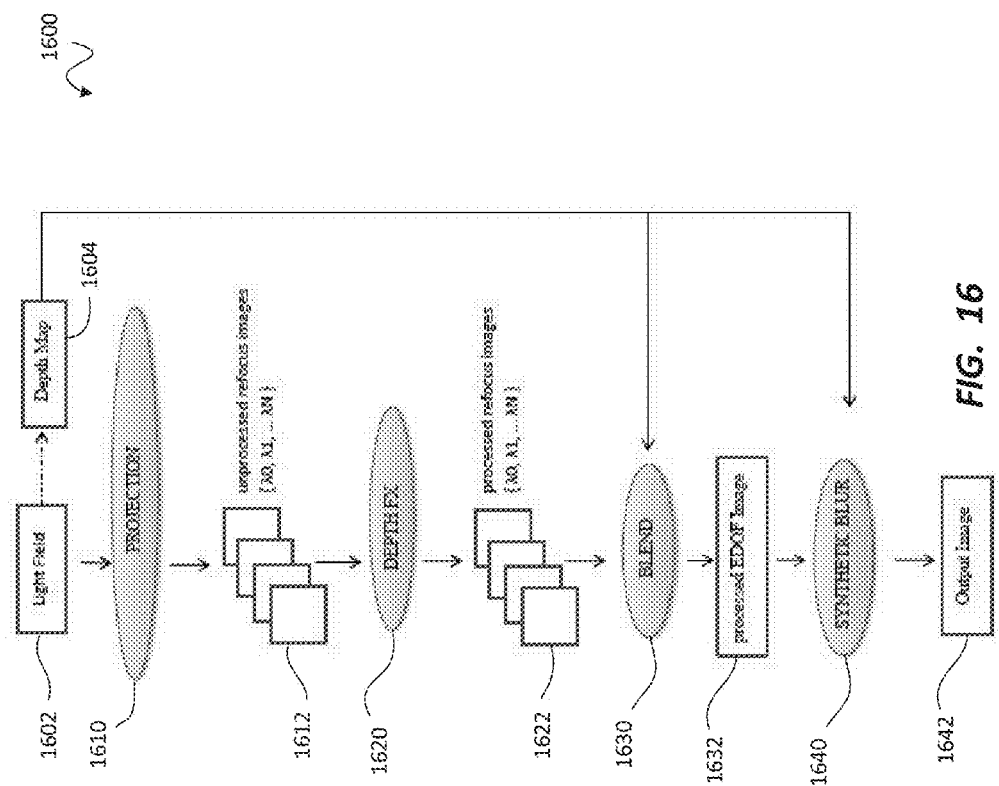
FIG. 16 is a schematic block diagram indicating how effects may be applied to a light-field image, according to a second approach.
Figure 17:
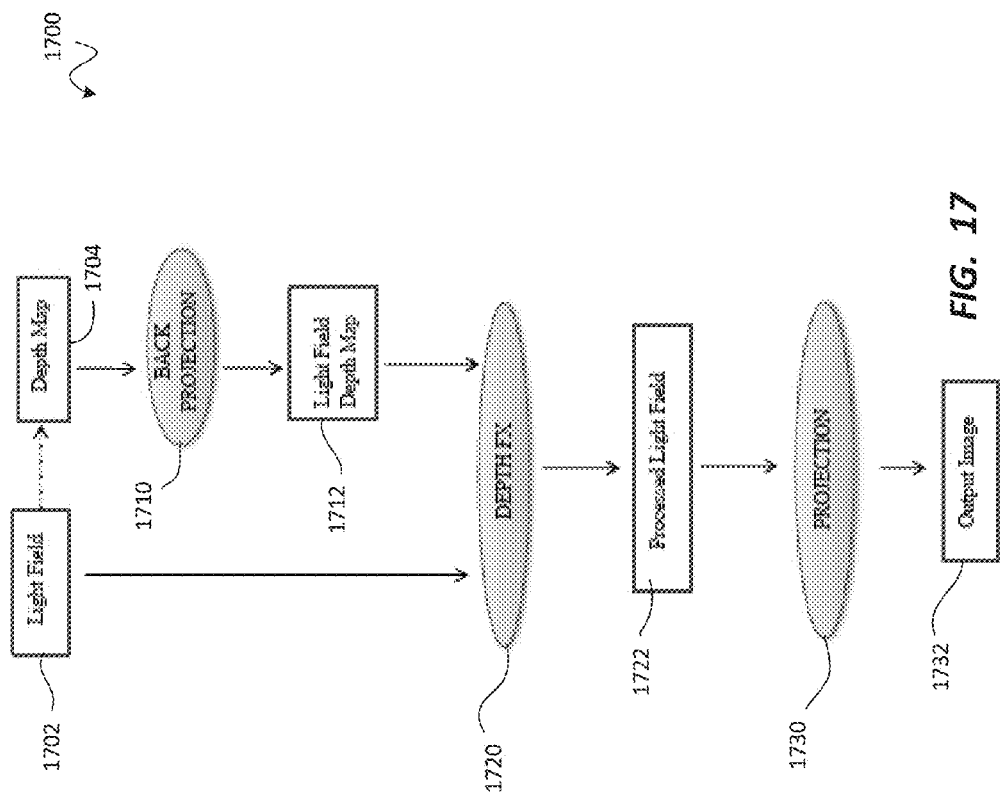
FIG. 17 is a schematic block diagram indicating how effects may be applied to a light-field image, according to a third approach.

Application of the effects, as described herein, may be carried out in conjunction with various other image processing steps. As described below, FIGS. 15, 16, and 17 illustrate three different image processing approaches that may be used to apply effects. Any of these may be implemented in the context of a user interface such as that shown and described above in connection with FIGS. 7 through 14. If desired, the image processing approach may be hidden from the user.

FIG. 15 is a schematic block diagram 1500 indicating how effects may be applied to a light-field image 1502, according to a first approach. In this approach, one or more depth effects 1520 may be applied in a post-processing stage, and may be applied to a two-dimensional image, such as an unprocessed EDOF image 1512, created from the light-field image 1502 and a depth map 1504 through the use of projection 1510. Each unprocessed EDOF image 1512, may be an extended depth of field projection of the light-field captured by the corresponding light-field image 1502, in which everything in the scene is in-focus at a given set of u,v perspective coordinates.

Application of the depth effects 1520 may result in the generation of a processed EDOF image 1522. Synthetic blur 1530 may be added to the processed EDOF image 1522 as a final post-processing step using the depth map 1504. The result may be the generation of an output image 1532 in which the depth effects 1520 are present.

FIG. 16 is a schematic block diagram 1600 indicating how effects may be applied to a light-field image 1602, according to a second approach. This approach may be similar to that of FIG. 15, in that one or more depth effects 1620 may still be applied two-dimensionally in a post-processing stage. However, in this implementation, the depth effect 1620 may be applied to a sequence of unprocessed refocus images 1612, each of which is projected 1610 to a different plane at depth X. The depth effect 1620 may be applied to generate a sequence of processed refocus images 1622, each of which corresponds to one of the unprocessed refocus images 1612.

The processed refocus images 1622 may subsequently be collapsed in a blending process 1630 into a single, processed EDOF image 1632. In this case, the mask for each layer in the sequence could be a function of λ—the depth of that refocus plane.

Implementation of the blending process 1630 may result in the generation of a processed EDOF image 1632. As in FIG. 15, synthetic blur 1640 may be added to the processed EDOF image 1632 as a final post-processing step using the depth map 1604. The result may be the generation of an output image 1642 in which the depth effects 1620 are present.

FIG. 17 is a schematic block diagram 1700 indicating how effects may be applied to a light-field image 1702, according to a third approach. This approach may differ from those of FIGS. 15 and 16 in that it may apply depth effects 1720 to the light-field image 1702 prior to projection 1730. Back-projection 1710 may be applied to a depth map 1704 to estimate the depth at each point of the light-field image 1702. The result may be the generation of a light-field depth map 1712 at light-field resolution, which may be used to create depth-effect masks at light-field resolution. Each of one or more depth effects 1720 may be applied to the light-field image 1702, and the mask may be used to blend application of the depth effects 1720 with the light-field image 1702 to generate a processed light-field image 1722.

Any form of light-field projection, such as projection 1730, can then be applied to the processed light-field image 1722. The result may be the generation of an output image 1732.

Those of skill in the art will recognize that FIGS. 15, 16 and 17 represent only three of many possible processing approaches that may be used to apply depth-based effects. In other embodiments, different approaches may be used to obtain the desired balance between image quality and processing time. Further, in some embodiments, any two or more of the approaches described above (or other approaches) may be combined.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for applying a first effect to a first image, the method comprising:
   in a data store, receiving the first image;
   in the data store, receiving a first depth map indicative of first and second depths at which objects in first and second portions of the first image are disposed, respectively, relative to a camera;
   in a processor, applying a first function to the first depth map to generate a first mask defining a gradual transition between the first depth and the second depth;
   in the processor, applying a first effect to the first image such that applicability of the first effect to the first image is determined by the first mask;
   in the processor, generating a processed image in which the first effect is present; and
   on a display device, displaying the processed image.

2. The method of claim 1, wherein applying the first effect comprises performing a step selected from the group consisting of:
   modifying an exposure level of the first image;
   modifying a contrast level of the first image;
   modifying a saturation level of the first image; and
   modifying a color of the first image.

3. The method of claim 1, wherein applying the first function comprises applying a linear ramp function such that the gradual transition comprises one of a rising linear gradient between the first and second depths, and a declining linear gradient between the first and second depths.

4. The method of claim 1, wherein applying the first function comprises applying a bell function such that the gradual transition comprises a generally bell-shaped rise and fall between the first and second depths.

5. The method of claim 1, wherein applying the first function comprises applying a radial function to a user-designated selection of spatial coordinates of the first image such that the gradual transition comprises a generally radial gradient between the first and second depths, based at least in part on spatial coordinates.

6. The method of claim 1, further comprising, at an input device, receiving first user input that designates a first limit comprising a selection from the group consisting of a minimum depth and a maximum depth;
   wherein applying the first function to the first depth map comprises limiting application of the first function to pixels of the first depth map for which the first depth map has a depth within the first limit.

7. The method of claim 6, further comprising, at the input device, receiving second user input that designates a second limit comprising the other of the minimum depth and the maximum depth;
   wherein applying the first function to the first depth map further comprises limiting application of the first function to pixels of the first depth map for which the first depth map has a depth within the second limit.

8. The method of claim 1, further comprising, at the processor, applying a second effect;
   wherein the second effect is also present in the processed image.

9. The method of claim 8, wherein applying the first effect to the first image comprises generating a second image;

wherein applying the second effect comprises applying the second effect to the second image.

10. The method of claim 9, further comprising applying a second function to the first depth map to generate a second mask;
   wherein applying the second effect to the second image comprises applying the second effect such that applicability of the second effect to the second image is determined by the second mask.

11. The method of claim 8, wherein applying the first effect to the first image comprises generating a second depth map indicative of third and fourth depths at which objects in third and fourth portions of the first image are disposed, respectively, relative to the camera;
   wherein the method further comprises applying a second function to the second depth map to generate a second mask defining a gradual transition between the third depth and the fourth depth;
   and wherein applying the second effect comprises applying the second effect such that applicability of the second effect is determined by the second mask.

12. The method of claim 1, wherein the first image is obtained through use of a light-field image capture device having a sensor and a plurality of microlenses.

13. The method of claim 12, wherein the first image comprises a light-field image that has been captured by the light-field image capture device;
   wherein generating the first mask comprises generating the first mask in two dimensions;
   and wherein applying the first effect to the first image comprises back projecting the first mask to four dimensions.

14. The method of claim 12, wherein the first image comprises an EDOF image obtained by processing a light-field image that has been captured by the light-field image capture device.

15. The method of claim 12, wherein the first image comprises a projection at a specific depth, of a light-field image that has been captured by the light-field image capture device.

16. A non-transitory computer-readable medium for applying a first effect to a first image, comprising instructions stored thereon, that when executed by a processor, perform the steps of:
   causing a data store to receive the first image;
   causing the data store to receive a first depth map indicative of first and second depths at which objects in first and second portions of the first image are disposed, respectively, relative to a camera;
   applying a first function to the first depth map to generate a first mask defining a gradual transition between the first depth and the second depth;
   applying a first effect to the first image such that applicability of the first effect to the first image is determined by the first mask;
   generating a processed image in which the first effect is present; and
   causing a display device to display the processed image.

17. The non-transitory computer-readable medium of claim 16, wherein applying the first effect comprises performing a step selected from the group consisting of:
   modifying an exposure level of the first image;
   modifying a contrast level of the first image;
   modifying a saturation level of the first image; and
   modifying a color of the first image.

18. The non-transitory computer-readable medium of claim 16, wherein applying the first function comprises applying a linear ramp function such that the gradual transition comprises one of a rising linear gradient between the first and second depths, and a declining linear gradient between the first and second depths.

19. The non-transitory computer-readable medium of claim 16, wherein applying the first function comprises applying a bell function such that the gradual transition comprises a generally bell-shaped rise and fall between the first and second depths.

20. The non-transitory computer-readable medium of claim 16, wherein applying the first function comprises applying a radial function to a user-designated selection of spatial coordinates of the first image such that the gradual transition comprises a generally radial gradient between the first and second depths, based at least in part on spatial coordinates.

21. The non-transitory computer-readable medium of claim 16, further comprising instructions stored thereon, that when executed by a processor, perform the steps of:
   causing an input device to receive first user input that designates a minimum depth; and
   causing the input device to receive second user input that designates a maximum depth;
   wherein applying the first function to the first depth map comprises limiting application of the first function to pixels of the first depth map for which the first depth map has a depth greater than the minimum depth and less than the maximum depth.

22. The non-transitory computer-readable medium of claim 16, further comprising instructions stored thereon, that when executed by a processor, apply a second effect;
   wherein the second effect is also present in the processed image.

23. The non-transitory computer-readable medium of claim 22, wherein applying the first effect to the first image comprises generating a second depth map indicative of third and fourth depths at which objects in third and fourth portions of the first image are disposed, respectively, relative to the camera;
   wherein the non-transitory computer-readable medium further comprises instructions stored thereon, that when executed by a processor, apply a second function to the second depth map to generate a second mask defining a gradual transition between the third depth and the fourth depth;
   and wherein applying the second effect comprises applying the second effect such that applicability of the second effect is determined by the second mask.

24. The non-transitory computer-readable medium of claim 16, wherein the first image is obtained through use of a light-field image capture device having a sensor and a plurality of microlenses;
   wherein the first image comprises a light-field image that has been captured by the light-field image capture device;
   wherein generating the first mask comprises generating the first mask in two dimensions;
   and wherein applying the first effect to the first image comprises back projecting the first mask to four dimensions.

25. The non-transitory computer-readable medium of claim 16, wherein the first image is obtained through use of a light-field image capture device having a sensor and a plurality of microlenses;
   wherein the first image comprises an EDOF image obtained by processing a light-field image that has been captured by the light-field image capture device.

26. The non-transitory computer-readable medium of claim 16, wherein the first image is obtained through use of a light-field image capture device having a sensor and a plurality of microlenses;

wherein the first image comprises a projection at a specific depth, of a light-field image that has been captured by the light-field image capture device.

27. A system for applying a first effect to a first image, the system comprising:

a data store configured to:
  receive the first image; and
  receive a first depth map indicative of first and second depths at which objects in first and second portions of the first image are disposed, respectively, relative to a camera;
a processor communicatively coupled to the data store, configured to:
  apply a first function to the first depth map to generate a first mask defining a gradual transition between the first depth and the second depth;
  apply a first effect to the first image such that applicability of the first effect to the first image is determined by the first mask; and
  generate a processed image in which the first effect is present; and
a display device, communicatively coupled to the processor, configured to display the processed image.

28. The system of claim 27, wherein the processor is configured to apply the first effect by performing a step selected from the group consisting of:
  modifying an exposure level of the first image;
  modifying a contrast level of the first image;
  modifying a saturation level of the first image; and
  modifying a color of the first image.

29. The system of claim 27, wherein the processor is configured to apply the first function by applying a linear ramp function such that the gradual transition comprises one of a rising linear gradient between the first and second depths, and a declining linear gradient between the first and second depths.

30. The system of claim 27, wherein the processor is configured to apply the first function by applying a bell function such that the gradual transition comprises a generally bell-shaped rise and fall between the first and second depths.

31. The system of claim 27, wherein the processor is configured to apply the first function by applying a radial function to a user-designated selection of spatial coordinates of the first image such that the gradual transition comprises a generally radial gradient between the first and second depths, based at least in part on spatial coordinates.

32. The system of claim 27, further comprising an input device, communicatively coupled to the processor, configured to:
  receive first user input that designates a minimum depth; and
  receive second user input that designates a maximum depth;
  wherein applying the first function to the first depth map comprises limiting application of the first function to pixels of the first depth map for which the first depth map has a depth greater than the minimum depth and less than the maximum depth.

33. The system of claim 27, wherein the processor is further configured to apply a second effect;
  wherein the second effect is also present in the processed image.

34. The system of claim 33, wherein the processor is configured to apply the first effect to the first image by generating a second depth map indicative of third and fourth depths at which objects in third and fourth portions of the first image are disposed, respectively, relative to the camera;
  wherein the processor is further configured to apply a second function to the second depth map to generate a second mask defining a gradual transition between the third depth and the fourth depth;
  and wherein the processor is configured to apply the second effect by applying the second effect such that applicability of the second effect is determined by the second mask.

35. The system of claim 27, wherein the first image is obtained through use of a light-field image capture device having a sensor and a plurality of microlenses;
  wherein the first image comprises a light-field image that has been captured by the light-field image capture device;
  wherein the processor is configured to generate the first mask by generating the first mask in two dimensions;
  and wherein the processor is configured to apply the first effect to the first image by back projecting the first mask to four dimensions.

36. The system of claim 27, wherein the first image is obtained through use of a light-field image capture device having a sensor and a plurality of microlenses;
  wherein the first image comprises an EDOF image obtained by processing a light-field image that has been captured by the light-field image capture device.

37. The system of claim 27, wherein the first image is obtained through use of a light-field image capture device having a sensor and a plurality of microlenses;
  wherein the first image comprises a projection at a specific depth, of a light-field image that has been captured by the light-field image capture device.

* * * * *